United States Patent [19]
McWhirter

[11] Patent Number: 5,988,604
[45] Date of Patent: Nov. 23, 1999

[54] MIXING IMPELLERS ESPECIALLY ADAPTED FOR USE IN SURFACE AERATION

[75] Inventor: John R. McWhirter, Boalsburg, Pa.

[73] Assignee: General Signal Corporation, Rochester, N.Y.

[21] Appl. No.: 08/948,558

[22] Filed: Oct. 10, 1997

[51] Int. Cl.$^6$ ....................................................... B01F 7/18
[52] U.S. Cl. ........................................... 261/91; 261/119.1
[58] Field of Search ................................. 261/91, 93, 84, 261/119.1; 210/219

[56] References Cited

U.S. PATENT DOCUMENTS

| | | |
|---|---|---|
| 2,157,436 | 5/1939 | Renken ....................................... 261/91 |
| 3,341,450 | 9/1967 | Ciabattari et al. ......................... 261/91 |
| 3,865,721 | 2/1975 | Kaelin . |
| 4,145,383 | 3/1979 | Randall . |
| 4,169,047 | 9/1979 | Wilson . |
| 4,240,905 | 12/1980 | Scaccia . |
| 4,240,990 | 12/1980 | Inhofer et al. . |
| 4,267,052 | 5/1981 | Chang . |
| 4,290,885 | 9/1981 | Kwak . |
| 4,310,437 | 1/1982 | Schreiber . |
| 4,548,765 | 10/1985 | Hultholm et al. . |
| 4,806,251 | 2/1989 | Durda . |
| 5,356,569 | 10/1994 | Von Berg . |

FOREIGN PATENT DOCUMENTS

| | | | |
|---|---|---|---|
| 1964125 | 6/1971 | Germany ................................. | 261/91 |
| 46-3554 | 1/1997 | Japan ...................................... | 261/91 |

*Primary Examiner*—David A. Simmons
*Assistant Examiner*—Robert A. Hopkins
*Attorney, Agent, or Firm*—M. LuKacher; K LuKacher

[57] ABSTRACT

Impellers are provided which enhance the efficiency of surface aeration of a liquid, for example, liquid contained in open aeration tanks, in terms of the mass of oxygen transferred per hour to the liquid per horsepower used in driving the impeller. The impeller is an axial flow impeller and may be either a pitched blade turbine (PBT) or have airfoil shaped blades. In either case, the impeller has a portion which extends radially along an edge thereof which projects above the surface of the liquid being mixed in a vertical direction, a sufficient distance to substantially prevent flow of the liquid over the top edges of the blades of the impeller. Preferably, the impeller is rotated in an up-pumping direction and propels the liquid being aerated in a radially outward direction. A sufficient upward surge of liquid is produced so that the liquid is observed to splash back onto the surface a plurality of times in the course of operation of the impeller. Such multiple splashing action enhances the contact between the air and the liquid and lends itself to the improved efficiency of aeration.

19 Claims, 5 Drawing Sheets

MIXING IMPELLERS ESPECIALLY ADAPTED FOR USE IN SURFACE AERATION

The present invention relates to impellers which are especially adapted for use in surface aeration of liquids in an open tank when disposed at the surface of the liquid in the tank, and particularly to an improved surface aeration impeller which has hydraulic performance which lends itself to high efficiency of aeration in terms of the mass of oxygen transferred to the liquid per applied energy per unit time, for example, in units of pounds of oxygen per horsepower hour.

Surface aeration impellers which have been used are generally either radial flow impellers or pitched blade turbines (PBT). The blades are flat rectangular plates which are pitched, usually at an angle of 45° to the axis of rotation of the impeller. The 45° pitch is also to the surface of the liquid in the tank when the impeller is not causing flow of the liquid. This is termed the static level of the liquid. Such impellers are located close to the static liquid surface and a small (10 to 20 percent) portion of the width of the blade can project up through the surface. Usually the direction of rotation is such that the leading edge of the blade is above the surface, while the trailing edge is below the surface. In other words, the impeller is pitched forwardly in the direction of rotation of the impeller about its axis of rotation. With such rotation, the impeller is normally down-pumping. The liquid is pushed out in front of the angled blade and discharged radially across the surface of the tank with some of the liquid being sprayed (usually in large drops and not as an atomized spray) into the atmospheric air from the outer upper surfaces of the blade.

It has been discovered in accordance with the present invention that at the liquid submergence levels of the blades for normal operation as surface aerators, a significant quantity of liquid overflows the upper or leading edge of the blades and falls back into the impeller itself without being pumped and sprayed beyond the outer periphery of the impeller blades. The amount of liquid which is moved per unit of energy input (the hydraulic efficiency) of the impeller is adversely affected due to the flow of liquid over the top of the blade characterizing the normal PBT turbine surface aeration impeller operation. In addition, the overflow of liquid over the leading edge of the blades is believed to overload or flood the impeller with liquid which creates a hydraulic condition detracting from its hydraulic pumping capacity and oxygen transfer efficiency.

A surface aeration impeller provided by the invention has a structure and mode of operation which counteracts the foregoing hydraulic and oxygen transfer deficiencies.

Therefore, it is the principal object and feature of this invention to provide improved surface aeration impellers which are especially adapted for use as surface aerators which operate more efficiently than conventional surface aeration impellers, and particularly impellers of the conventional 45° PBT type.

It is a further object of the invention to provide improved axial flow aeration impellers which may be operated in an up-pumping direction causing flow, which creates a hydraulic surge ahead of and radially outward from the impeller at a plurality of positions radially outward of the tank, at each of which increased turbulence occurs, such as splashing, which further enhances the oxygen transfer efficiency of the system.

It is a still further object of the present invention to provide improved PBT aeration impellers.

It is a still further object of the present invention to provide improved surface aeration of impellers which may have camber and may be of air foil shape.

Briefly described, the improved aeration impeller provided by the invention may be used in the system for aeration of liquid in a tank. The system comprises the impeller, a shaft which rotates the impeller, and by means of which the impeller is located at the surface of the liquid. The impeller has a plurality of blades which are rotatable about the shaft axis and extends below and above the surface of the liquid in the tank. Each of the blades has a first portion which is pitched with respect to the axis and to the surface of the liquid in the tank and projects above the surface. The impeller also has a second portion which extends generally vertically upward with respect to the surface of the liquid. Preferably the height of the second portion is such that when the impeller is rotating at a speed to effectively aerate the liquid, flow of the liquid over the vertical portions of the blades is essentially eliminated.

The foregoing and other objects, features and advantages of the invention, as well as a presently preferred embodiment thereof, will become more apparent from the reading of the following description in connection with the accompanying drawings in which.

Figure 1:
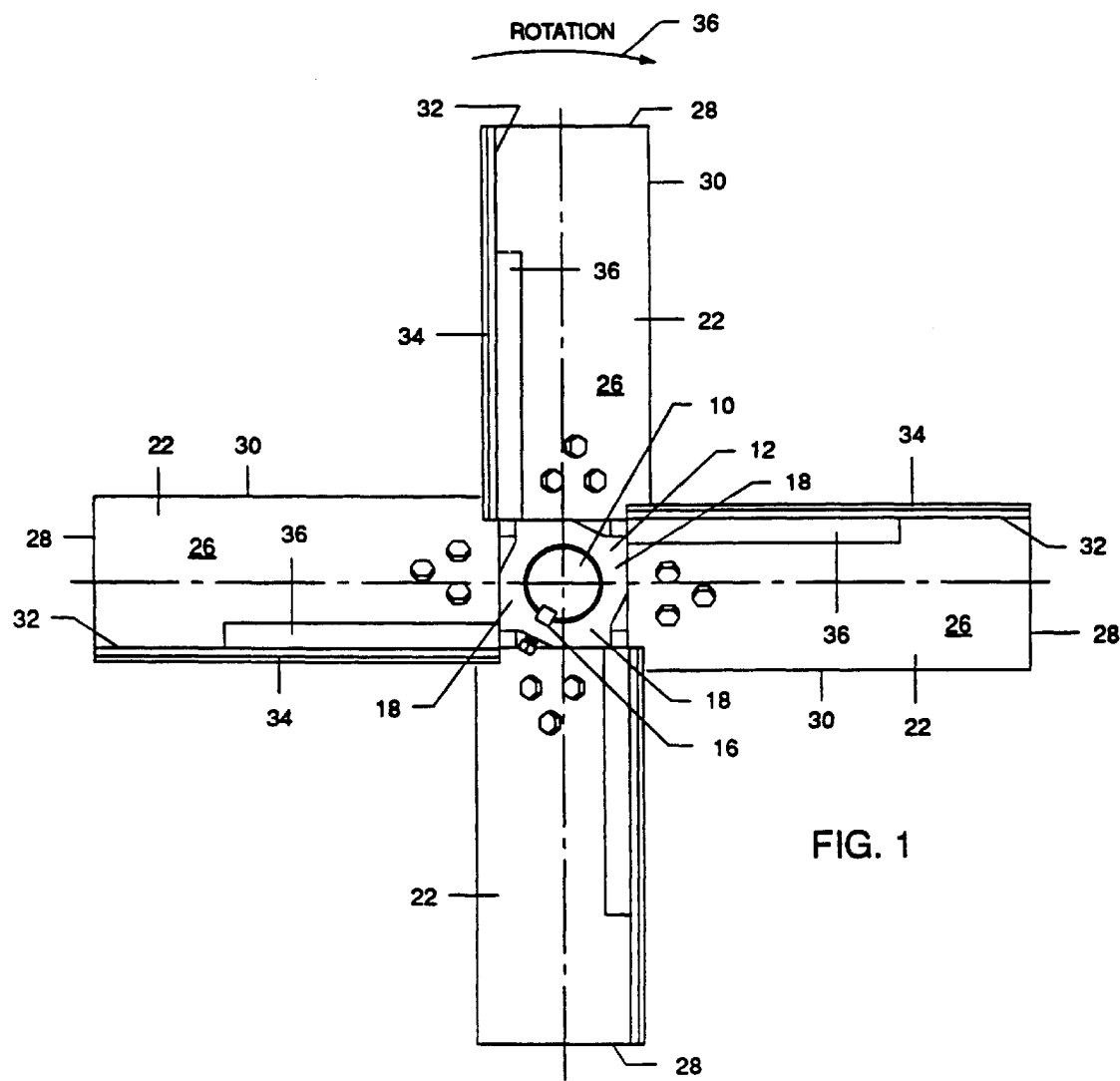
FIG. 1 is a plan view of a PBT aeration impeller in accordance with the invention.
Figure 2:
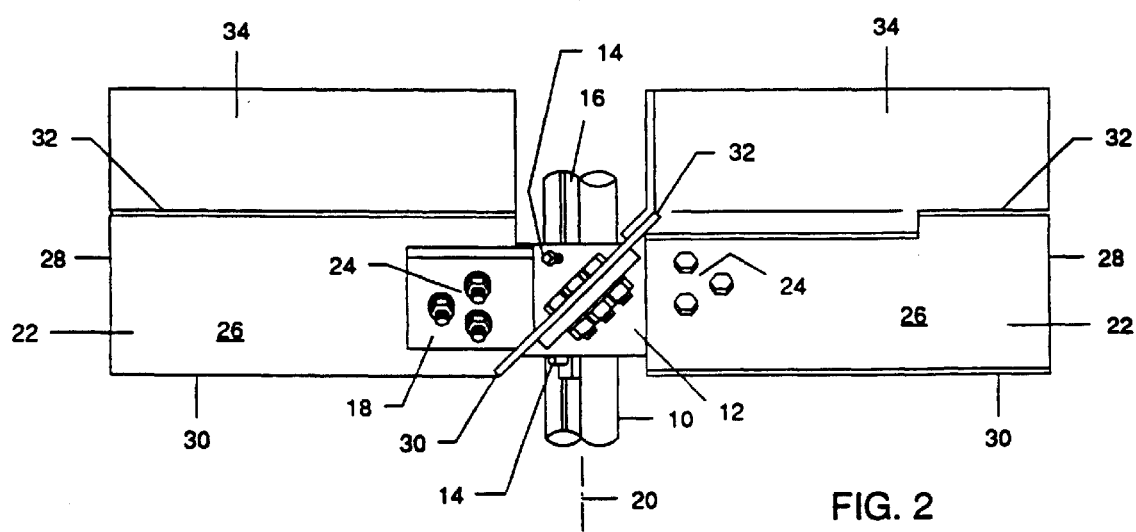
FIG. 2 is a front elevation of the impeller shown in FIG. 1.
Figure 3:
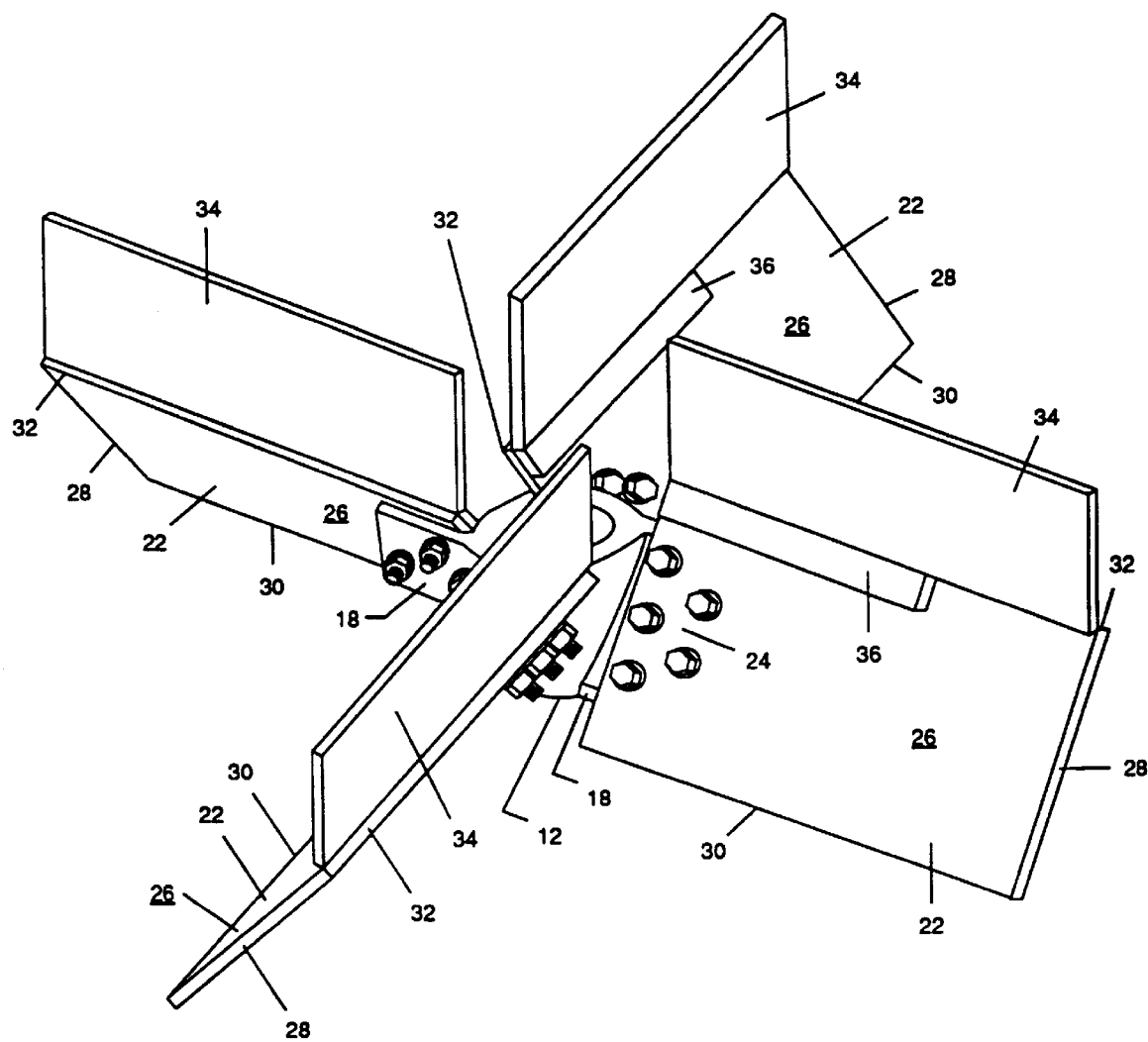
FIG. 3 is a perspective view of the impeller shown in FIGS. 1 and 2.
Figure 4:
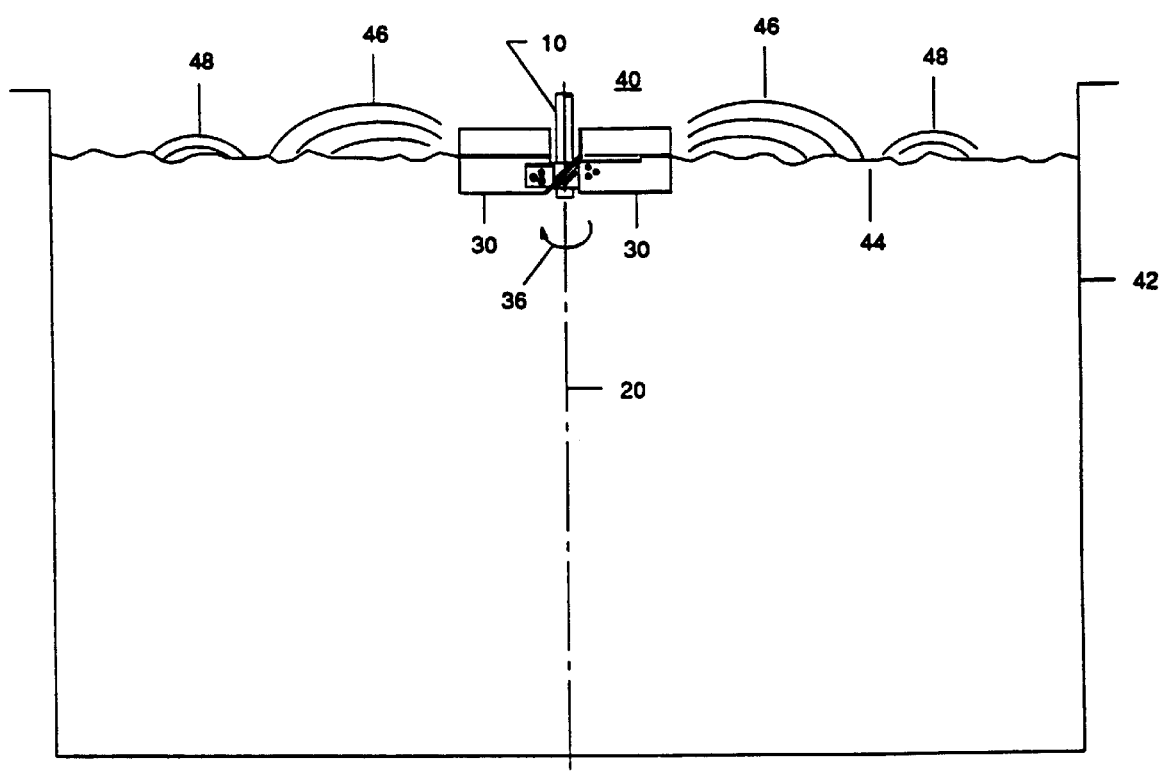
FIG. 4 is a view of an aeration system including the impeller shown in FIGS. 1, 2 and 3 in an open aeration tank.
Figure 5:
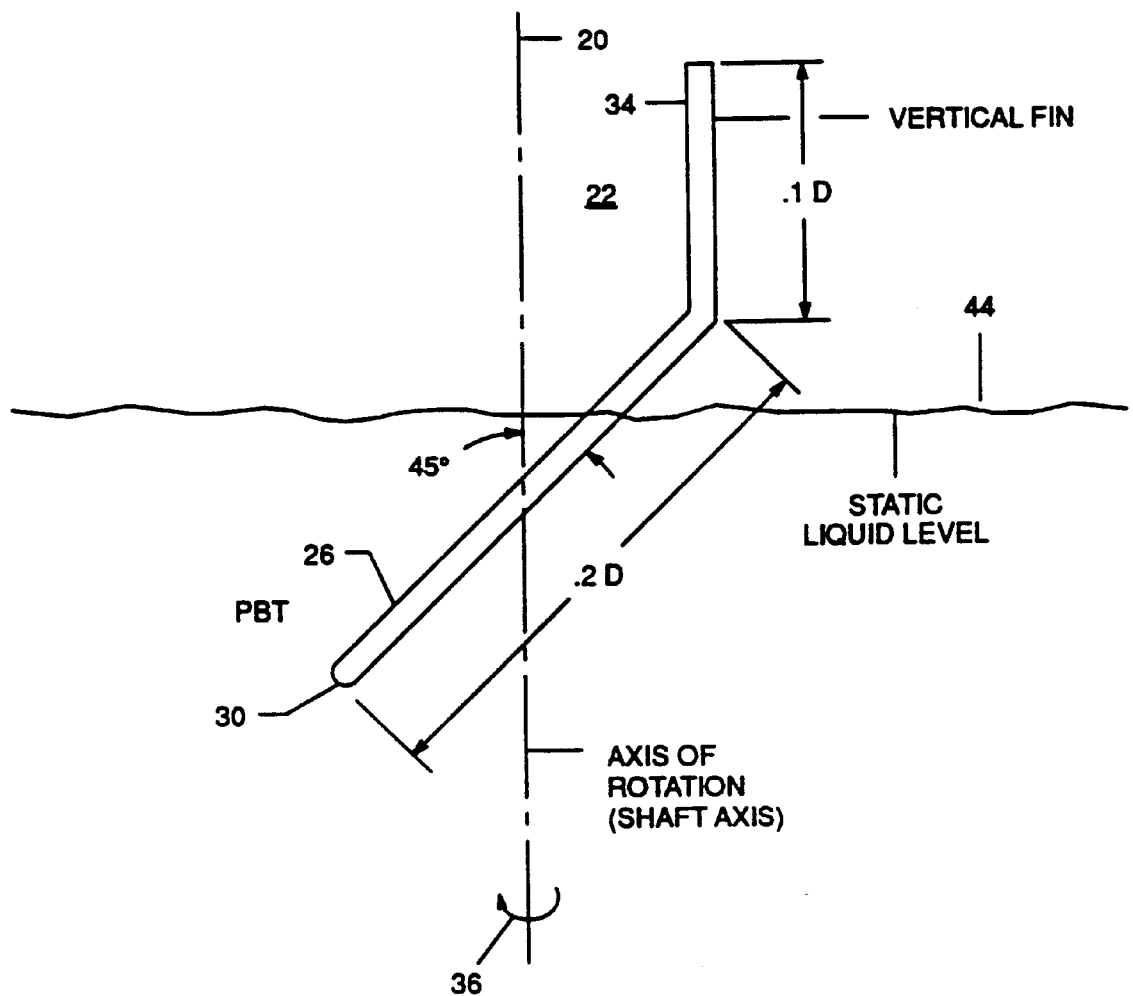
Figure 6:
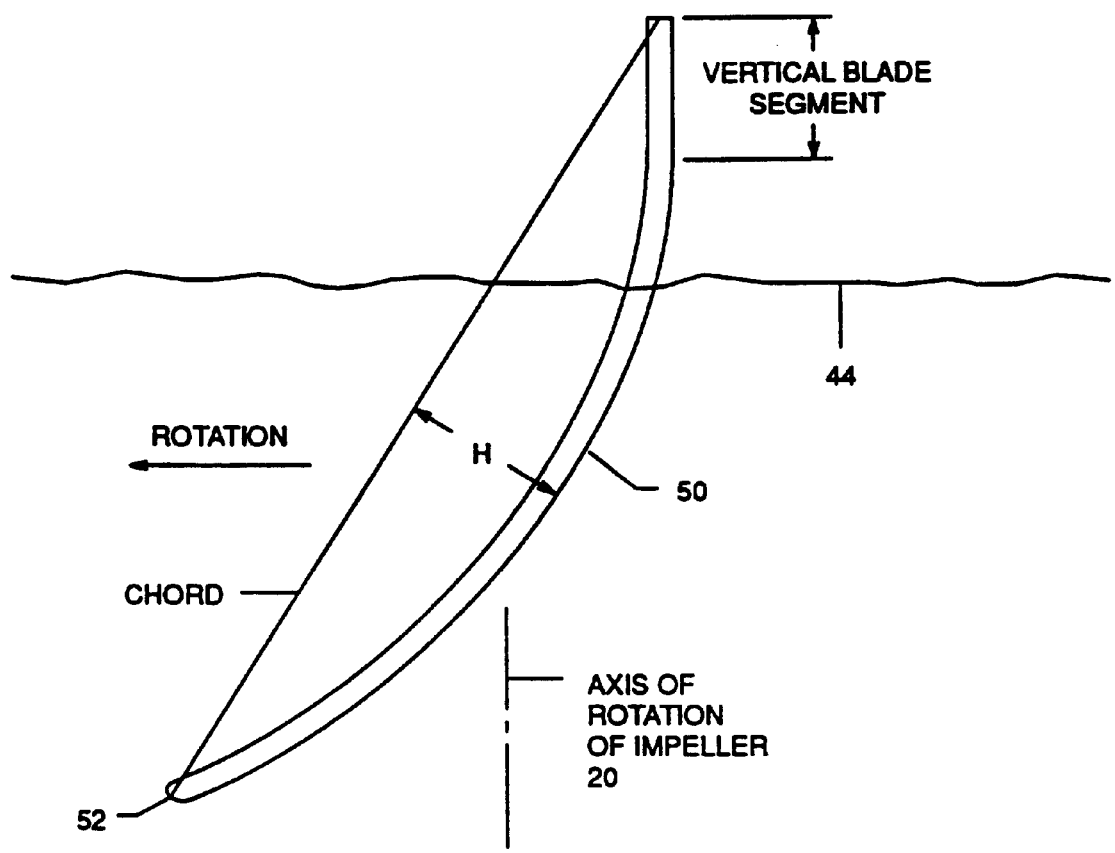

FIG. 5 is a front elevation towards the tip of one of the blades of the impeller shown in FIGS. 1, 2 and 3, which is labeled and dimensioned in accordance with dimensions which are believed to be optimum in an aeration system as shown in FIG. 4 (that is, an open tank surface aeration system where the tank diameter is three to six times the diameter of the impeller); and FIG. 6 is an end view in elevation, similar to FIG. 5, illustrating an air foil (sometime called hydrofoil) surface aeration impeller and showing the chord between the leading and trailing edges thereof and the height from the mid-line (halfway of the thickness of the impeller) to the chord, which as a percentage of the chord, is the camber of the impeller.

Referring more particularly to FIGS. 1, 2 and 3, there shown a shaft 10 having a hub 12 attached thereto by set screws 14 and a key 16. The hub therefore rotates with the shaft. The hub has four arms 18 which are tilted at an angle (45°) with respect to the axis of rotation 20. Four blades 22 are attached to the arms 18 by groups 24 of bolts and nuts. The number of bolts and nuts in the group depends upon the dimensions of the impeller. Other attachment means, such as weldments may be used for attaching the blades 22 to the hub 12. The blades have portions 26 which are generally rectangular plates having tips 28 at the radially outward ends of the blades between radially extending edges 30 and 32 at the bottom and top of the portions 28 of each of the blades 22.

The blade portions 28 are at 45° with respect to the shaft axis 20. Each of the blade portions has a vertically upward extending portion 34 which is a rectangular plate having a lip 36 by means of which the portions 34 are attached along the upper edge 32 of each of the blades. The attachment may be by means of weldments or bolts.

The vertically extending portions 34 provide blades which substantially, and in many cases, totally eliminate the hydraulic deficiency which has been discovered to exist when the impellers are standard 45° PBT surface aeration impellers, namely that when operating to aerate the liquid in a tank, overflow of liquid over the upper edge 32 is substantially eliminated. The portions 34 act as supplementary liquid spraying surfaces. They act to direct the liquid to flow radially outward instead of overflowing the top edges of the blade. The liquid leaving the tips 28 discharges as a high-velocity liquid spray, which may be in the form of bodies of liquids or drops which splash back onto the liquid surface in the tank and, which have been found to increase the hydraulic efficiency of the impeller of FIGS. 1–3, especially when used as a surface aerator. The pumping rate, and the circulation rate and the oxygen transfer capacity of the aeration system, including the impeller of FIGS. 1–3, are increased over surface aeration systems using the conventional or standard 45° PBT aeration impellers.

The impeller may be rotated in the same direction as conventionally used for normal surface aeration PBT impellers, which is counterclockwise as shown in FIG. 1. The preferred direction of rotation is clockwise as indicated by the arrow 36 in FIG. 1, since the mass transfer efficiency and hydraulic pumping capacity is further enhanced, than with the conventional counterclockwise direction used for conventional PBT surface aeration impellers. In the conventional direction, the upper edge of the impeller 32 is the leading edge and the lower edge 30 is the trailing edge. The impeller is then down-pumping. Up-pumping operation is presently preferred and if additional circulation is required, a secondary impeller may be located on an extension of the shaft which is located further downward from the surface in the tank.

The impeller, illustrated in FIGS. 1, 2 and 3, is shown in FIG. 4 at 40, located in the center of a tank 42 which may be a large circular or rectangular tank of several hundred thousand gallons capacity, up to a million gallons, typical of tanks used for wastewater treatment aeration. The diameter or width of the tank may be several times the diameter of the impeller, say three to six times the diameter of the impeller in a typical installation. The shaft 10 of the impeller is driven by a conventional drive, including a motor and gear box (not shown). The surface 44 of the liquid is illustrated as being the static level in FIG. 4. However, during actual operation, the impeller is rotating in an up-pumping direction (see arrow 36). The lower edges 30 are the leading edges and the 45° pitched portions 26 are disposed so that the upper edges 32 thereof, are slightly (suitably 10 to 20 percent of the width of the blades) above the surface 44 when at the static level, and the blades rotate in the up-pumping direction as illustrated by the arrow 36. Then a surge of liquid results, which raises the level 44 in front of the impeller blades. The liquid is smoothly pumped up and across the blades and radially across the vertically extending portions 34 thereof, and is efficiently discharged at the blade tips 28. The height of the vertical portions is also such that most of the liquid is discharged as the radial spray indicated at 46 at the tips of the blades. The spray drops back onto the surface of the liquid in the tank, splashing and further increasing the contact with the air, thereby improving the mass transfer and oxygenation of the liquid. It has also been found that there is an additional hydraulic jump or spray 48 further radially outward from the axis 20, perhaps one or two feet from the inner spray 46. This outer spray also splashes back towards the surface of the liquid in the tank 42, still further enhancing the aeration and mass transfer efficiency of the aeration system.

FIG. 5 illustrates an improved blade 22 having the 45° pitched portion 26 and the vertical portion 34, which may also be considered as providing a vertical fin on the portion 26. It will also be noted that the blade may be made in one piece rather than having the vertical portion 34 attached to the pitched portion 26. It is preferable that the leading, lower edge 30 be a knife edge or rounded, so as to reduce vortices at the leading edge as the blade rotates in the direction 36 and provides for up-pumping operation. The dimensions for the width of the blade portions 26 and 34, shown in FIG. 5, have been found especially suitable for surface aeration operation. A typical overall surface aerator diameter may be 5 to 10 feet.

The following table illustrates the improvement in mass transfer efficiency, in terms of the pounds of oxygen per horse power per hour (SAE). The first row in the table is data for a conventional, standard 45° PBT operated in the usual down-pumping direction. The second row is for an aeration impeller illustrated in FIGS. 1 through 5, in an up-pumping mode. Both impellers were arranged centrally in an approximately 980,000 gallon tank.

TABLE

| IMPELLER | IMPELLER DRIVING POWER (HP) | SAE | SOTR |
| --- | --- | --- | --- |
| STD | 94.98 | 2.72 | 258.00 |
| FIGS. 1–5 | 97.06 | 3.01 | 291.99 |

Where, SAE is the standard aeration efficiency in pounds of $O_2$ per HP-Hr. (Horsepower-Hour), and SOTR is the standard oxygen ($O_2$) transfer rate in pounds of oxygen per3+—hour. Standard conditions are room temperature (20° C.) and one atmosphere pressure. Note that the table shows an increase in SAE of about 10%, but under extremely severe aeration conditions with low driving HP per 1000 gallons of liquid under aeration.

Referring to FIG. 6, there is shown an air foil impeller 50 provided by the invention and used as a surface aeration impeller. This impeller 50 is made of a plate and has camber which is the ratio of the maximum height (H) to the length of the chord. The chord is pitched at an angle with respect to the axis of rotation and the surface 44 of the liquid. The pitch may suitably be about 45°. The leading edge 52 of the impeller is rounded or knife-edged and the impeller has a vertical blade segment which extends a sufficient distance above the surface 44 so as to provide the enhanced pumping and hydraulic efficiency as well as enhanced aeration characteristics as discussed in connection with the improved PBT impeller illustrated in FIGS. 1 through 5.

From the foregoing description, it will be apparent that there has been provided an improved surface aeration system and aeration impellers especially suitable for use therein. Variations and modifications in the system and in the herein-described impellers, within the scope of the invention, will undoubtedly suggest themselves to those skilled in the art. Accordingly, the foregoing description should be taken as illustrative and not in a limiting sense.

I claim:

1. In a system for aeration of liquid in a tank, an improved surface aeration impeller, said liquid in said tank having its surface at a certain level when static, which impeller comprises a plurality of generally rectangular blades rotatable about an axis and extending below and above said surface, each of said blades having a first portion which is pitched with respect to said axis and to the surface of said liquid in said tank, and which is disposed below said surface and projects above said surface, and a second portion of said blade which extends generally vertically with respect to said surface of said liquid when static, upwardly from said first portion.

2. The system according to claim 1 wherein said second portion of said blade is of sufficient height such that when said impeller is rotating at sufficient speed to aerate said liquid, flow of said liquid over said vertical portions of said blades is substantially eliminated.

3. The system according to claim 1 wherein said system has means for rotating said shaft in a direction for said impeller to cause liquid flow generally upwardly and radially outward to lift said liquid into first and second splash patterns closer and further radially outward from said impeller thereby enhancing the aeration efficiency of said system.

4. The system according to claim 3 wherein said blades each have leading and trailing edges, said direction of rotation being such that the leading edge of said blade is lower and below said surface of said liquid when static and said trailing edge is above said surface when said liquid is static.

5. The system according to claim 4 wherein said leading edge has, in cross section across said blade, a shape selected from the group consisting of knife edges and rounded edges, thereby reducing vortices in said liquid flow at said leading edge.

6. The system according to claim 1 wherein said impeller defines a pitched blade turbine having generally rectangular plates, the surface of which are at an acute angle to said axis.

7. The system according to claim 6 wherein said angle is about 45°.

8. The system according to claim 6 wherein said second portion is a second plate or an extension of said first plate extending radially along an edge of said first plate, which first and second plates provide said blades and which second plate is disposed above the static liquid level.

9. The system according to claim 8 wherein said first blade portion has a width between radially extending edges thereof, equal to about 0.2 D, where D is the diameter of said impeller, and said second plate has a width of about ½ the width of said first plate.

10. The system according to claim 1 wherein each of said blades is a curved member having an airfoil shape defining a chord and having camber, said blade being disposed so that said chord is at an acute angle to said axis, said member having first and second portions, at least a portion of said second portion, at least in part extending vertically above said liquid level.

11. The system according to claim 10 wherein said chord angle varies from about 30° to 60°.

12. An impeller for aeration of liquid when rotated about an axis which intersects the surface of said liquid and which axis is generally vertical to said surface, said impeller comprising a plurality of blades of shape to provide for axial flow of said liquid, each blade having a first blade portion with a surface which drives said liquid and extending generally entirely radially from said axis and a second portion having a surface which also extends generally entirely radially from said axis and also extending in a direction generally along said axis so that said axially extending portion projects generally vertically above said surface to drive and engage said liquid as said liquid is driven axially by said first portion thereby substantially preventing flow in a direction opposite to the direction of rotation of said impeller over said second portion.

13. The impeller according to claim 12 wherein said axially extending blade portion is entirely above said surface.

14. The impeller according to claim 13 wherein said impeller is a pitched blade turbine and said blades having edges, one below and the other above, said surface, said portion extending above said surface being a plate extending from said edge above said surface.

15. The impeller according to claim 14 wherein said edge below said surface is the leading edge of said impeller.

16. The impeller according to claim 15 wherein said leading edge is rounded or knife-edged to reduce flow vortices around said leading edge.

17. The impeller according to claim 12 wherein said blades are airfoils having chords and camber, said chords being in a plane which extends substantially entirely radially from said axis and being disposed at an acute angle to said axis.

18. The impeller according to claim 1 wherein said principal part contains about eighty to ninety percent of the width of said first portion.

19. The impeller according to claim 1 wherein said impeller is uncovered and unshrouded.

\* \* \* \* \*